(12) United States Patent
Foelling (10) Patent No.: US 11,143,854 B2
(45) Date of Patent: Oct. 12, 2021

(54) METHOD FOR IMAGING A SAMPLE USING A FLUORESCENCE MICROSCOPE WITH STIMULATED EMISSION DEPLETION

(71) Applicant: Leica Microsystems CMS GmbH, Wetzlar (DE)

(72) Inventor: Jonas Foelling, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/955,803

(22) PCT Filed: Dec. 20, 2018

(86) PCT No.: PCT/EP2018/086083
§ 371 (c)(1),
(2) Date: Jun. 19, 2020

(87) PCT Pub. No.: WO2019/122070
PCT Pub. Date: Jun. 27, 2019

(65) Prior Publication Data
US 2020/0341253 A1  Oct. 29, 2020

(30) Foreign Application Priority Data
Dec. 22, 2017 (DE) ...................... 10 2017 131 249.8

(51) Int. Cl.
*G02B 21/06* (2006.01)
*G02B 21/00* (2006.01)
*G01N 21/64* (2006.01)

(52) U.S. Cl.
CPC ..... *G02B 21/0032* (2013.01); *G01N 21/6458* (2013.01); *G02B 21/008* (2013.01); *G02B 21/0076* (2013.01); *G01N 2201/04* (2013.01)

(58) Field of Classification Search
CPC ............ G02B 21/0032; G02B 21/0076; G02B 21/008; G02B 21/367; G01N 21/6458; G01N 2201/04
See application file for complete search history.

(56) References Cited

U.S. PATENT DOCUMENTS 10,955,348 B2 * 3/2021 Hell ................... G01N 21/6428
2016/0305884 A1  10/2016 Hell
(Continued)

FOREIGN PATENT DOCUMENTS

DE  102011051086 A1  12/2012
DE  102013114860 B3   5/2015
(Continued)

OTHER PUBLICATIONS

Heine, Jörn et al., "Adaptive-illumination STED nanoscopy" PNAS, vol. 114 No. 37, 9797-9802, Sep. 12, 2017, XP055466784.
(Continued)

*Primary Examiner* — David P Porta
*Assistant Examiner* — Mamadou Faye
(74) *Attorney, Agent, or Firm* — Leydig, Voit & Mayer, Ltd.

(57) ABSTRACT

A method for imaging a sample using a fluorescence microscope with stimulated emission depletion includes controlling the fluorescence microscope and an imaging process of the fluorescence microscope by a microscope controller. An overview image of a target region is generated with a second spatial resolution prior to the imaging process, the second spatial resolution being lower than a first spatial resolution used for scanning sample segments in the imaging process and higher than a third spatial resolution that has been adapted to an extent of an excitation light distribution. The overview image is analyzed to identify image regions without relevant image information. A radiant flux of the deple-
(Continued)

tion light distribution is reduced within a scope of the imaging process when scanning sample segments which are assigned to the image regions without relevant image information.

15 Claims, 3 Drawing Sheets

(56) References Cited

U.S. PATENT DOCUMENTS

2017/0082844 A1   3/2017   Hell et al.
2019/0011367 A1   1/2019   Hell et al.

FOREIGN PATENT DOCUMENTS

| DE | 102016117096 A1 | 3/2017 |
| DE | 102016119262 A1 | 4/2018 |
| DE | 102016119263 A1 | 4/2018 |
| DE | 102016119264 A1 | 4/2018 |
| DE | 102017102604 A1 | 8/2018 |
| WO | WO 2017/153430 A1 | 9/2017 |

OTHER PUBLICATIONS

Göttfert, Fabian et al., "Strong signal increase in STED fluorescence microscopy by imaging regions of subdiffraction extent", PNAS, vol. 114 No. 9, 2125-2130, Feb. 28, 2017.

* cited by examiner

METHOD FOR IMAGING A SAMPLE USING A FLUORESCENCE MICROSCOPE WITH STIMULATED EMISSION DEPLETION

CROSS-REFERENCE TO PRIOR APPLICATIONS

This application is a U.S. National Phase Application under 35 U.S.C. § 371 of International Application No. PCT/EP2018/086083, filed on Dec. 20, 2018, and claims benefit to German Patent Application No. DE 10 2017 131 249.8, filed on Dec. 22, 2017. The International Application was published in German on Jun. 27, 2019 as WO 2019/122070 A1 under PCT Article 21(2).

FIELD

The invention relates to a method for imaging a sample using a fluorescence microscope with stimulated emission depletion, including an imaging process in which the fluorescence microscope is controlled by means of a microscope controller in such a way that an illumination focus is generated by virtue of overlaying a focused depletion light distribution on a focused excitation light distribution, as a result of which, during the illumination with the illumination focus, the sample is excited to emit imaging fluorescence light only within an effective excitation focus, the extent of which is reduced in relation to the extent of the excitation light distribution, and a multiplicity of sample segments are scanned successively within a target region of the sample by means of the illumination focus with a first spatial resolution that has been adapted to the reduced extent of the effective excitation focus and said sample segments are imaged into a corresponding multiplicity of image segments, from which a scanned image is generated. Further, the invention relates to a fluorescence microscope operating in this manner.

BACKGROUND

The recent past has seen the development of fluorescence-microscopic methods that allow sample structures to be imaged with a spatial resolution that is not limited by the resolution limit of light-microscopic imaging as formulated by Ernst Abbe. The so-called stimulated emission depletion, abbreviated STED, is one of a number of methods that facilitate such an increased spatial resolution.

In STED microscopy, a laser beam is focused into the sample in order to excite fluorescent dyes present there to emit fluorescence radiation. The excitation light distribution generated in the sample in this way has a spatial extent which is subject to the light-microscopic resolution limit; i.e., it cannot be reduced arbitrarily. In order nevertheless to facilitate an increased spatial resolution, a focused depletion light distribution is overlaid on the excitation light distribution by radiating in light which depletes the excited fluorescent dyes by way of stimulated emission. This depletion light distribution, also referred to as STED light below, which forms the illumination focus together with the excitation light distribution, usually has a ring-shaped intensity profile with a central minimum, in which the intensity drops to zero where possible.

In order to increase the spatial resolution, the depletion light distribution is overlaid on the excitation light distribution in such a way that its central intensity zero is located exactly in the region of the intensity maximum of the excitation light distribution. Therefore, this central region contains no depletion, caused by stimulated emission, of the fluorescent dyes that have been excited by the excitation light distribution. Expressed differently, the spontaneous fluorescence emission is not suppressed by the depletion light distribution in the central region.

However, the spontaneous fluorescence emission is suppressed in the outer regions of the excitation light distribution that adjoin the aforementioned central region, the intensity of the superposed depletion light distribution initially increasing sharply from zero in said outer regions. As a result, the superposition of the depletion light distribution and the excitation light distribution yields a resolution-increasing reduction in the sample region that can even be excited by the excitation light to emit fluorescence light usable for imaging. This sample region, the extent of which is significantly reduced in relation to the extent of the excitation light distribution, is denoted the effective excitation focus below.

The facts explained above are elucidated in exemplary fashion in FIG. 1. Here, FIG. 1 shows a cross section through a typical light distribution used in STED microscopy to increase the spatial resolution (in the x-direction in FIG. 1).

Figure 1:
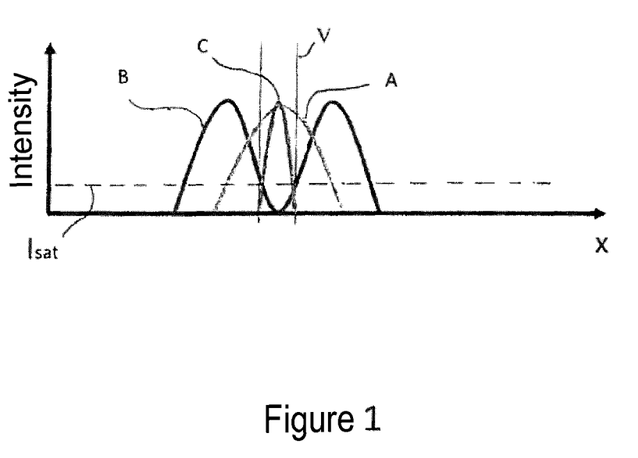
FIG. 1 shows a cross section through a light distribution used in STED microscopy for increasing the spatial resolution.

In FIG. 1, A denotes the excitation light distribution and B denotes the depletion light distribution, i.e., the STED light. The only excitation-effective part of the excitation light distribution A is located within the central region between the two vertical lines V, with the excitation effectiveness of this part, which varies in accordance with the curve of the depletion light distribution within the central region, being indicated by the curve C in FIG. 1. Thus, the curve C also reflects the aforementioned effective excitation focus. Further, FIG. 1 specifies a saturation intensity $I_{sat}$. This denotes the intensity required, using the STED light B, to completely deplete the fluorescent dyes contained in the sample by way of stimulated emission.

Now, a problem with the light distribution shown in FIG. 1 is that the STED light B must have a zero at the center, where the excitation light distribution has its maximum intensity, and must already, at the same time, increase to the saturation intensity $I_{sat}$ as close to this zero as possible in order to restrict the effective excitation focus to a sample region that is as small as possible. This restricted sample region defines the effective point spread function, abbreviated PSF, and hence spatial resolution. However, currently, such an intensity distribution of the STED light, which has a zero and an intensity that increases to the required value $I_{sat}$ as sharply as possible in the immediate vicinity of the zero, can only be generated using a comparatively high radiant flux, necessarily leading to the intensity distribution of the STED light B initially having intensities that are many times higher than $I_{sat}$ with increasing distance from the zero. However, these light intensities, which are unnecessary for fluorescence suppression per se but necessarily accompany a high radiant flux, lead to sample regions impinged therewith being exposed to a particularly high light exposure, leading to pronounced photobleaching of the fluorescent dyes and, moreover, possibly causing damage in the examined tissue. Thus, during a conventional STED imaging process, all sample segments to be imaged at the highest resolution are scanned with the entire light distribution as per FIG. 1, i.e., in particular, also with the intensity overshoots of the STED light B further away from the zero, in which the light intensity is greater than the saturation intensity $I_{sat}$.

Photobleaching which occurs in conventional STED microscopy methods often renders it impossible to image a sample multiple times, for instance in order to detect changes in the sample over time. Frequently, photobleaching is so strong that it is not even possible to record a single scanned image or the recorded image contains so little signal that an evaluation is difficult. This is problematic, particularly in the case of three-dimensional image recording processes, since every sample segment is struck quite frequently by the light distribution in this case and consequently bleaches particularly strongly.

The prior art has disclosed a few solutions that are directed to reducing photobleaching, especially in STED applications as well. One of these solutions proposes measuring whether the fluorescence signal lies above a predetermined limit at each pixel or sample segment for a short diagnostic time period during the scanning process. Should this be the case, the illumination focus made up of the excitation light distribution and the STED light continues to remain activated and the captured fluorescence signal is stored for this sample segment. By contrast, should the fluorescence signal captured during the diagnostic time period lie below the threshold, the illumination focus is deactivated since the assumption is made that no fluorescent dye is located in the STED detection region in this case. As a result, fluorescent dyes located outside of the STED detection region are spared from the illumination focus.

In Gottfert et al., "Strong signal increase in STED fluorescence microscopy by imaging regions of subdiffraction extent", PNAS 2017, vol. 114 no. 9, 2125-2130, only very small portions of the sample are scanned by the illumination focus. These portions are so small that the region of interest is significantly smaller than a confocal PSF. This ensures that the sample structure of interest only comes into contact with the STED light distribution in the region directly adjoining the zero and not in the outer regions, in which the STED light distribution has particularly high intensities. Consequently, this method is only applicable to very small image fields, typically of less than 150 nm. Moreover, special electrooptic scanners are required for performing this method since conventional mechanical scanners are unsuitable for such small image fields.

In Heine et al., "Adaptive-illumination STED nanoscopy", PNAS 2017, vol. 114 no. 37, 9797-9802, a process is presented, in which the fluorescence signal originating from each individual sample segment is likewise analyzed during the STED imaging process. However, in this case, the signal is not analyzed under full intensity of the illumination focus. Rather, the radiant flux of the illumination focus is incrementally increased.

In the case of such a process carried out pixel-by-pixel, the capture of the STED light intensity undertaken for analysis purposes already takes up a certain amount of time. The actual recording of data for this pixel is only implemented thereafter, and this also takes time. This yields a very long overall measurement time. Thus, the dwell time of the illumination focus is currently approximately 80 to 100 µs per pixel. When recording a two-dimensional image, which typically has a size of 10 µm×10 µm with a pixel edge length of 10 nm, this leads to an overall measurement time of 80 to 100 s. When recording a three-dimensional image, such a measurement time arises for each individual image plane, drastically increasing the time expenditure.

What should be noted in this case is that if conventional mechanical scanners are used, it is not, as a rule, readily possible to quickly jump from one pixel, in which no signal has been detected, to the next pixel in order to reduce the dwell time on the first pixel by at least the time required to read the image signal. This is because such a jump would lead to irregularities in the scanning process, and hence to image aberrations, on account of the inertia of the scanner. Consequently, all pixels must always be scanned at the same slow speed in the prior art.

SUMMARY

In an embodiment, the present invention provides a method for imaging a sample using a fluorescence microscope with stimulated emission depletion. The method includes controlling the fluorescence microscope and an imaging process of the fluorescence microscope by a microscope controller such that the following steps are performed: generating an illumination focus by virtue of overlaying a focused depletion light distribution on a focused excitation light distribution for the stimulated emission depletion, as a result of which, during illumination with the illumination focus, the sample is excited to emit imaging fluorescence light only within an effective excitation focus, an extent of which is reduced in relation to an extent of the excitation light distribution; scanning a plurality of sample segments successively within a target region of the sample by the illumination focus with a first spatial resolution that has been adapted to the reduced extent of the effective excitation focus, the sample segments being imaged into a corresponding plurality of image segments, from which a scanned image is generated; generating an overview image of the target region with a second spatial resolution prior to the imaging process, the second spatial resolution being lower than the first spatial resolution and higher than a third spatial resolution that has been adapted to the extent of the excitation light distribution, the overview image being analyzed such that image regions without relevant image information are identified; and reducing at least a radiant flux of the depletion light distribution within a scope of the imaging process when scanning the sample segments which are assigned to the image regions without relevant image information that were identified in the overview image.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a method that allows a sample to be imaged quickly and in sample-sparing fashion using a fluorescence microscope with stimulated emission depletion. In another embodiment, the present invention provides a fluorescence microscope operating accordingly.

An embodiment of the present invention provides a method for imaging a sample using a fluorescence microscope with stimulated emission depletion, which includes an imaging process in which the fluorescence microscope is controlled by means of a microscope controller in such a way that an illumination focus is generated by virtue of overlaying a focused depletion light distribution on a focused excitation light distribution for stimulated emission depletion, as a result of which, during the illumination with the illumination focus, the sample is excited to emit imaging fluorescence light only within an effective excitation focus, the extent of which is reduced in relation to the extent of the excitation light distribution, and a multiplicity of sample segments are scanned successively within a target region of the sample by means of the illumination focus with a first spatial resolution that has been adapted to the reduced extent of the effective excitation focus and said sample segments are imaged into a corresponding multiplicity of image segments, from which a scanned image is generated. According to an embodiment of the invention, the fluorescence microscope is further controlled by means of the microscope controller in such a way that an overview image of the target region is generated with a second spatial resolution prior to the imaging process, said second spatial resolution being lower than the first spatial resolution and higher than a third spatial resolution that has been adapted to the extent of the excitation light distribution, and the overview image is analyzed for the purposes of identifying image regions without relevant image information, and at least the radiant flux of the depletion light excitation is reduced within the scope of the imaging process when scanning those sample segments which are assigned to the image regions without relevant image information that were identified in the overview image.

So as to protect the sample from photobleaching, an embodiment of the invention provides for a method step that precedes the actual imaging process, in which preceding method step an overview image of the target region is recorded in order to identify image regions without relevant image information. No sample structure of interest, which would have to be imaged in the subsequent STED imaging process with the highest image resolution, is present in such imaging regions. Consequently, the illumination focus can be modulated for sample segments assigned to these image regions that are irrelevant to the imaging in such a way that the light exposure of the sample caused thereby is reduced. According to an embodiment of the invention, this is implemented by virtue of reducing at least the radiant flux of the depletion light distribution, which is comparatively high during a normal STED imaging process in order to minimize the effective excitation focus. In order to facilitate an analysis of the overview image for the purposes of identifying image regions without relevant image information, the overview image is recorded with a spatial resolution which, firstly, is higher than the resolution achievable using the excitation light distribution on its own. Secondly, the spatial resolution of the overview image is lower than that used during the actual STED imaging for generating a highly resolved scanned image. As a result, it is possible to record the overview image very much faster than the STED scanned image.

Consequently, the method according to an embodiment of the invention offers significant speed advantages over conventional processes, which are designed to avoid bleaching effects and in which a decision in respect of whether the STED light should be activated or deactivated during the scanning procedure is made pixel-by-pixel, i.e., for each sample segment to be imaged. Thus, the time required in the prior art for the analysis process performed pixel-by-pixel is saved by the generation and analysis of the overview image according to an embodiment of the invention.

An embodiment of the invention permits an effective reduction of bleaching by virtue of at least the radiant flux of the STED light being modulated on the basis of the analysis of the overview image in such a way that as little of the sample structure as possible is impinged by an STED intensity above the saturation intensity sat during the scanning process. By way of example, this can be implemented by virtue of the full STED intensity only being activated if the sample structure to be imaged or a part thereof that is as large as possible is located in a region distributed tightly around the central zero of the STED light, i.e., in the region located between the two vertical lines V when referring to FIG. 1. If the sample structure to be recorded is situated in a region in which the STED intensity for the full STED radiant flux is higher than the saturation intensity or situated in a region in which no excitation light arrives, the STED radiant flux can be set by means of the method according to an embodiment of the invention in such a way that the sample structure is only impinged by the saturation intensity $I_{sat}$ and no more. Alternatively, the STED light can also be deactivated entirely. The full STED radiant flux should only be set when the sample structure to be recorded is located in a region tightly around the zero of the STED light distribution. Typically, this region extends away from the zero by up to 50 to 100 nm. In any case, this extent is smaller than the extent of the excitation light distribution which determines the spatial resolution of a confocal microscope usually used for STED imaging.

Preferably, the radiant flux of the excitation light distribution is additionally reduced when scanning those sample segments which are assigned to the image regions without relevant image information that were identified in the overview image. This contributes to reducing photobleaching even more effectively.

In a preferred embodiment, the specified radiant flux is reduced to zero. This means that the excitation light or the depletion light serving for stimulated emission depletion is deactivated during the STED imaging process for those sample segments that have no sample structure of interest.

Preferably, the overview image is generated with the second spatial resolution by virtue of a raw image initially being recorded with a spatial resolution that is lower than the second spatial resolution and image processing that increases spatial resolution then being performed on the raw image. This embodiment provides a two-step process for generating the overview image, wherein image data are provided in the form of a raw image with a comparatively low resolution in a first, substantially hardware-based step, which image data are then processed further to form the overview image with a higher resolution in a second, software-based step.

In one particularly preferred embodiment, the raw image is generated by virtue of the target region being scanned by means of the excitation light distribution with the third spatial resolution. This is advantageous in that substantially the same imaging process can be used for generating the raw image as for the subsequent recording of the STED image, with the difference that the sample is illuminated only by the excitation light and not the depletion light for the purposes of recording the raw image.

The aforementioned embodiment of the method is advantageously developed by virtue of the raw image being generated by confocal scanning imaging. The confocal raw image, which typically has a spatial resolution of around 250 nm, forms a suitable basis for the subsequent image processing, by means of which the overview image with a high resolution is generated.

The generation of the raw image need not necessarily be based on a scanning microscopic process. By way of example, the raw image can also be generated with the application of wide field illumination.

In one particularly preferred embodiment, the image processing for generating the overview image provides for a deconvolution of the raw image. For example, highly efficient deconvolution algorithms are available in the prior art which, with intelligent exploitation of the computational power of modern personal computers, facilitate a very short calculation times below several ten milliseconds. As a result, it is possible to generate the overview image within a very short period of time. Moreover, the deconvolution for increasing the image resolution is well suited, in particular, if the sample has tendentiously less dense coloring with fluorescent dyes, i.e., the fine sample structures to be examined in the actual imaging process are not located spatially too close together. The method according to an embodiment of the invention for reducing bleaching is particularly well suited to such a situation.

In an alternative embodiment, the overview image is generated by direct imaging of the target region with the second spatial resolution. Additional image processing is not required in this case.

By way of example, the overview image can be generated with the application of structured illumination.

It is likewise possible to generate the overview image by scanning the target region by means of the illumination focus, the radiant flux of the depletion light distribution being reduced in relation to the radiant flux used in the imaging process. Firstly, the reduced radiant flux is so weak that it does not bleach the sample or only slightly bleaches the sample. Secondly, it is at least so strong that the spatial resolution desired for the overview image is obtained. In this case, it is also possible to record a plurality of overview images with weak but differing STED radiant fluxes.

However, other processes for directly generating the overview image are applicable, e.g., a process referred to in the literature as "pixel reassignment", described, for example, in C. J. R. Sheppard, Optik, 1988, C. J. R. Sheppard et al., Optics Letters, 2013.

Preferably, a radiant flux table is created on the basis of the analysis of the overview image and stored, said radiant flux table assigning each sample segment to be imaged at least one value for the radiant flux of the depletion light distribution during the imaging process.

In one particularly preferred embodiment, exclusion regions are determined among the image regions without relevant image information that were identified in the overview image and the sample segments assigned to these exclusion regions are skipped when scanning the target region with the first spatial resolution. This allows relatively large sample regions, which are assigned, e.g., one or more successive lines of image segments, to be skipped in the high-resolution STED imaging process, as a result of which the imaging is further accelerated. Skipping whole lines is particularly advantageous since the scanning mirror used in a conventional STED scanning microscope, which steers the illumination focus to the next line, is only moved comparatively slowly, and so image aberrations are not noticeable or substantially less noticeable if the scanning mirror must traverse different distances in different regions. For instance, this applies if the scanning mirror jumps forward line-by-line in lines with image information while it skips one or more lines in lines without image information. In so doing, work can be carried out with conventional mechanical scanners which admit the scanning of a large image region. In particular, it is not necessary to rely on specific electrooptic scanners, which can only scan a very small image region.

Preferably, the second spatial resolution is increased in relation to the third spatial resolution by a factor of between 1.5 and 2.

Figure 2:
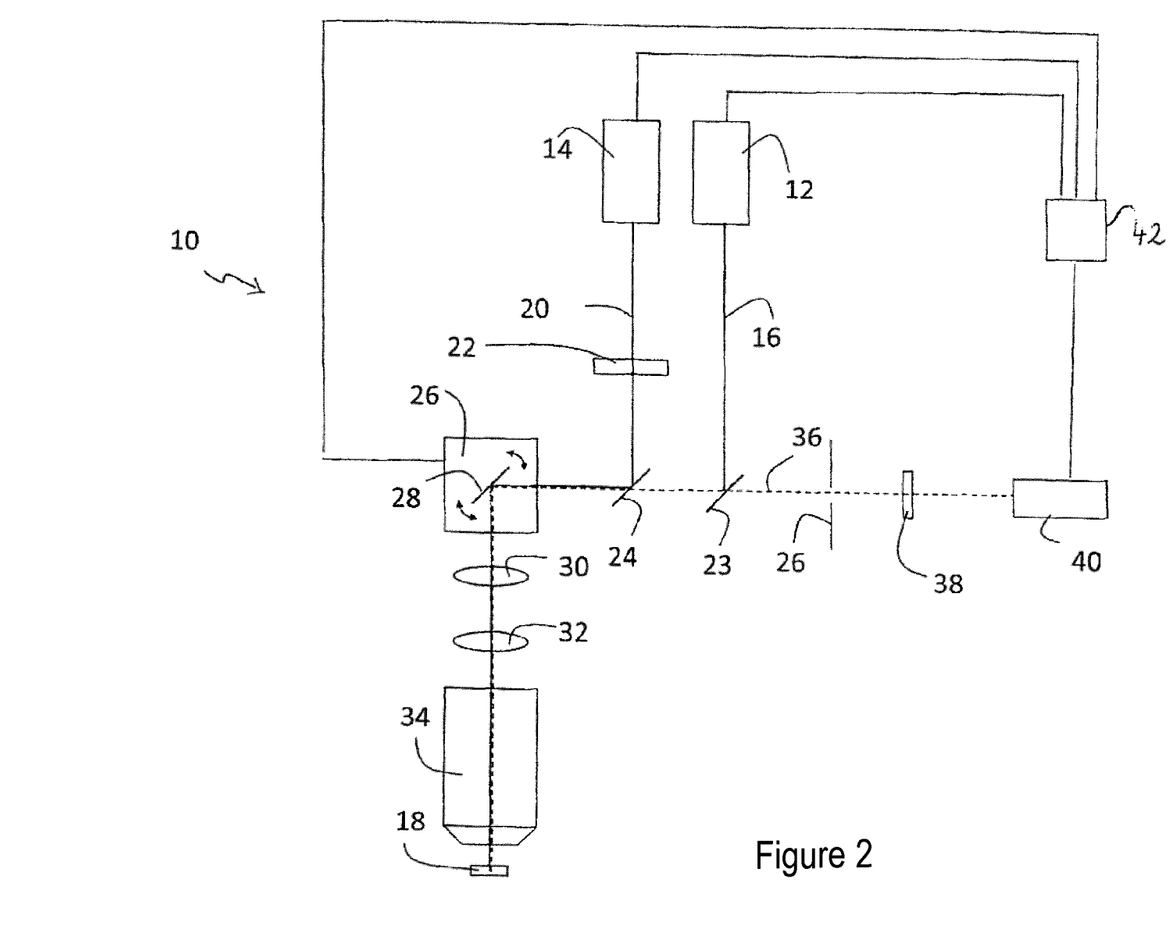
FIG. 2 shows a schematic illustration of a STED microscope according to an embodiment of the invention.

FIG. 2 shows a STED microscope 10 according to an embodiment of the invention, which is designed to image fluorescent sample structures with a high spatial resolution with the application of the principle of stimulated emission depletion, which principle is known per se.

The STED microscope 10 contains an excitation light source 12 and a depletion light source 14, each of which are embodied as a laser light source. The excitation light source 12 emits an excitation light beam 16, the wavelength of which is chosen in such a way that it excites fluorescent dyes contained in a sample 18 to be imaged to spontaneously emit fluorescence light. By contrast, the depletion light source 14 emits a depletion light beam 20, the wavelength of which is designed to deplete the fluorescent dyes contained in the sample 18 according to the principle of stimulated emission depletion.

The excitation light beam 16 emitted by the excitation light source 12 is reflected at a first dichroic beam splitter 23 in the direction of a second dichroic beam splitter 24, where the excitation light beam 16 is combined with the depletion light beam 20 that has previously passed through a phase modulator 22. To this end, the second beam splitter 24 is embodied in such a way that it transmits the excitation light beam 16 while it reflects the depletion light beam 22.

The light beams 16 and 20 that have been overlaid on one another by the second beam splitter 24 propagate onward to a scanning module 26, which contains a scanning mirror 28. Following the reflection at the scanning mirror 28, the excitation light beam 16 and the depletion light beam 20 pass through a scanning optical unit 30 and a tube optical unit 32 and are subsequently focused on the sample 18 by an objective 34.

The light beams 16, 20 focused by the objective 34 are overlaid in the sample 18 to form an illumination focus, which the scanning module 26 guides over the sample 18 in a scanning movement by tilting the scanning mirror 28. In this way, a target region of the sample 18 is scanned by the illumination focus during the STED imaging process.

The phase modulator 22 influences the depletion light beam 20 emitted by the depletion light source 14 in such a way that the depletion light distribution generated in the sample 18 by the objective 34 forms a ring focus, which is placed on the outer regions of the excitation light distribution focused into the sample 18 by the objective 34. As a consequence, the sample regions illuminated by the depletion focus are depleted by way of stimulated emission depletion and can no longer be excited to emit imaging fluorescence light by the excitation light distribution. Consequently, an effective excitation focus is formed in the central region of the illumination focus, the extent of said effective excitation focus being smaller than the extent of the excitation light distribution focused in the sample 18. Fluorescent dyes contained within the sample are only excited to emit fluorescence light within this effective excitation focus.

The spatial resolution with which the sample 18 is scanned with the illumination focus during the STED imaging process is adapted to the extent of the aforementioned effective excitation focus. Since this extent is significantly reduced in relation to the extent of the excitation light distribution, which was radiated into the sample 18, by the overlay of the depletion light distribution by way of the stimulated emission depletion, this yields a correspondingly high spatial resolution, with which the scanned image is generated during the STED imaging process.

The fluorescence light emitted by the sample 18, which is denoted by 36 in FIG. 2, returns to the scanning mirror 28 after passing through the objective 34, the tube optical unit 32 and the scanning optical unit 34. Following reflection at the scanning mirror 28, the fluorescence light 36 successively passes through the two dichroic beam splitters 24, 23, a detection pinhole 36 and a filter 38, before it is captured by a detector 40.

The STED microscope 10 further comprises a microscope controller 42, which controls the overall operation of the STED microscope 10. In particular, the microscope controller 42 controls the method, described below, for avoiding photobleaching effects.

FIGS. 3 to 6 elucidate in purely exemplary fashion how the method according to an embodiment of the invention can be performed.

Figure 3:
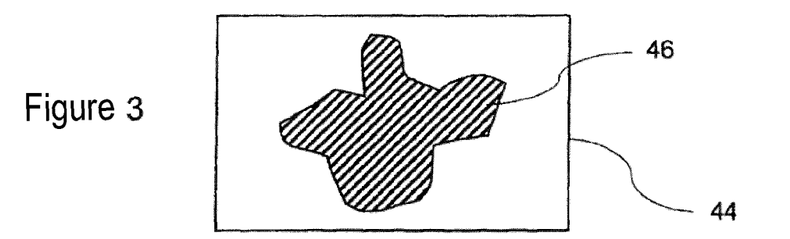
FIG. 3 shows a schematic illustration of a raw image, generated according to an embodiment of the invention, with the sample structure visible therein.

In a first step, the microscope controller 42 drives the STED microscope 10 in such a way that a scanned image is recorded in a manner known per se in the confocal mode prior to the actual STED imaging process, said scanned image representing a confocal raw image 44 to be processed further according to an embodiment of the invention. To this end, the sample 18 is illuminated only by the excitation light beam 16 and not by the depletion light beam 20. In the process, the excitation light beam 16 is guided over the sample 18 in a scanning movement by means of the scanning mirror 28. The spatial resolution with which the confocal raw image 44 is generated in this first step is adapted to the spatial extent of the excitation light distribution with which the objective 34 focuses into the sample 18. Since this extent is significantly greater than the extent of the effective excitation focus used within the scope of STED imaging, there is a significant reduction in the spatial resolution in relation to the STED resolution. As a consequence, the confocal raw image 44 can be generated significantly faster and in a manner more sparing to the sample than the STED image to be recorded later. As shown in FIG. 3, a sample structure 46 of interest is imaged in the confocal raw image 44 with a comparatively low spatial resolution.

Figure 4:
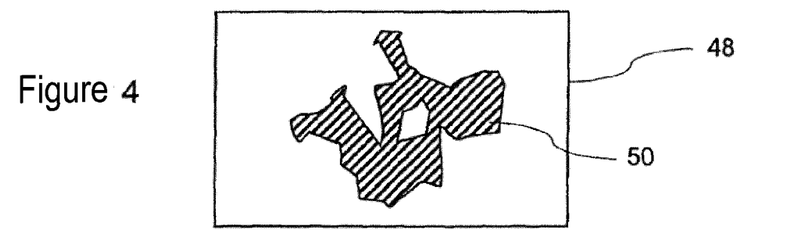
FIG. 4 shows a schematic illustration of an overview image, generated according to an embodiment of the invention, with the sample structure visible therein.

FIG. 4 elucidates a second step of the method, in which an overview image 48 is generated on the basis of the confocal raw image 44 for the purposes of increasing the spatial resolution by image processing, for example by applying a deconvolution algorithm. In the shown exemplary embodiment, the spatial resolution of the overview image 48 is elevated over that of the confocal raw image 44 by a factor of between approximately 1.5 and 2. Accordingly, the sample structure denoted by 50 in FIG. 4 is imaged significantly more sharply than in the confocal raw image 44 according to FIG. 3.

Figure 5:
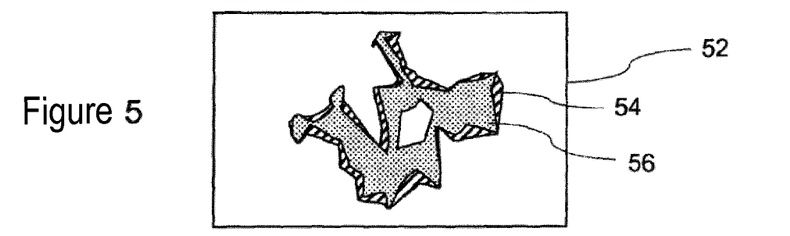
FIG. 5 shows a schematic illustration, which elucidates the function of a table, generated on the basis of the overview image, for controlling the radiant flux of the illumination focus.

FIG. 5 elucidates a third step of the method, in which the overview image is initially analyzed in order to identify image regions without relevant image information. In this third step, a radiant flux table is subsequently created on the basis of the analysis of the overview image 48 and stored, said radiant flux table assigning to each sample segment to be imaged with a high spatial resolution in the subsequent STED imaging process to be carried out control information in respect of the radiant flux of the illumination focus that should be used for said sample segment. In the present exemplary embodiment, this control information specifies whether the illumination focus should be activated or deactivated in its entirety for the currently considered sample segment. FIG. 5 shows a map 52, which represents assignment of the control information explained above to the individual sample segments in the form of the radiant flux table. Here, image regions in FIG. 5 outside of a region denoted by 56 are assigned to those sample regions for which the illumination focus should be deactivated within the scope of the STED imaging process. By contrast, the aforementioned region 56 specifies those sample segments for which the illumination focus should be activated within the scope of the STED imaging process.

Figure 6:
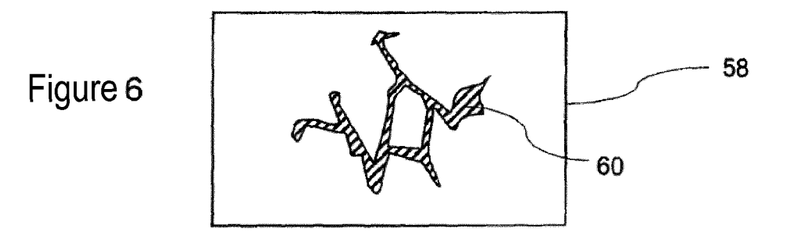
FIG. 6 shows a schematic illustration which shows a resultant STED scanned image with the sample structure visible therein.

FIG. 6 finally elucidates a fourth step of the method, in which the STED imaging process is carried out taking account of the control information generated in step 3. Here, FIG. 6 shows a resultant STED scanned image 58 with the sample structure 60 visible therein with a high resolution.

Here, reference is once again made to the fact that FIGS. 3 to 6 only elucidate a specific realization of the method according to the invention, which has a particularly simple embodiment. Thus, in this specific exemplary embodiment, the map 52 according to FIG. 5 relates to the illumination focus as a whole, without differentiating between the STED light and the excitation light distribution. This means that the control information contained in the map 52 in the specific example, as it were, consists only of zeros and ones and the illumination focus is deactivated overall for sample segments which have a zero assigned to them in each case, while said illumination focus is activated for those sample segments that have a one assigned thereto. However, provision can also be made of a more complex radiant flux modulation which also covers intermediate values, in particular in relation to the STED light. This yields correspondingly more complex radiant flux maps which create assignments between the image information contained in the overview image 48 and the illumination focus, in particular the STED light.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for imaging a sample using a fluorescence microscope with stimulated emission depletion, the method comprising:
controlling the fluorescence microscope and an imaging process of the fluorescence microscope by a microscope controller such that the following steps are performed:
generating an illumination focus by virtue of overlaying a focused depletion light distribution on a focused excitation light distribution for the stimulated emission depletion, as a result of which, during illumination with the illumination focus, the sample is excited to emit imaging fluorescence light only within an effective excitation focus, an extent of which is reduced in relation to an extent of the excitation light distribution;
scanning a plurality of sample segments successively within a target region of the sample by the illumination focus with a first spatial resolution that has been adapted to the reduced extent of the effective excitation focus, the sample segments being imaged into a corresponding plurality of image segments, from which a scanned image is generated;
generating an overview image of the target region with a second spatial resolution prior to the imaging process, the second spatial resolution being lower than the first spatial resolution and higher than a third spatial resolution that has been adapted to the extent of the excitation light distribution, the overview imago being analyzed such that image regions without relevant image information are identified; and
reducing at least a radiant flux of the depletion light distribution within a scope of the imaging process when scanning the sample segments which are assigned to the image regions without relevant image information that were identified in the overview image.

2. The method as claimed in claim 1, wherein a radiant flux of the excitation light distribution is reduced when scanning the sample segments which are assigned to the image regions without relevant image information that were identified in the overview image.

3. The method as claimed in claim 1, wherein the radiant flux is reduced to zero.

4. The method as claimed in claim 1, wherein the overview image is generated with the second spatial resolution by virtue of a raw image initially being recorded with a spatial resolution that is lower than the second spatial resolution and image processing that increases spatial resolution then being performed on the raw image.

5. The method as claimed in claim 4, wherein the raw image is generated by virtue of the target region of the sample being scanned by the excitation light distribution with the third spatial resolution.

6. The method as claimed in claim 5, wherein the raw image is generated by confocal scanning imaging.

7. The method as claimed in claim 4, wherein the raw image is generated with application of wide field illumination.

8. The method as claimed in claim 4, wherein the image processing provides for a deconvolution of the raw image.

9. The method as claimed in claim 1, wherein the overview image is generated by direct imaging of the target region of the sample with the second spatial resolution.

10. The method as claimed in claim 1, wherein the overview image is generated with application of structured illumination.

11. The method as claimed in claim 1, wherein the overview image is generated by scanning the target region of the sample by the illumination focus, the radiant flux of the depletion light distribution being reduced in relation to the radiant flux used in the imaging process.

12. The method as claimed in claim 1, wherein a radiant flux table is created based on the analysis of the overview image and stored, the radiant flux table assigning each sample segment to be imaged at least one value for the radiant flux of the depletion light distribution during the imaging process.

13. The method as claimed in claim 1, wherein exclusion regions are determined among the image regions without relevant image information that were identified in the overview image, the sample segments assigned to the exclusion regions being skipped when scanning the target region with the first spatial resolution.

14. The method as claimed in claim 1, wherein the second spatial resolution is increased in relation to the third spatial resolution by a factor of between 1.5 and 2.

15. A fluorescence microscope for imaging a sample with stimulated emission depletion, the fluorescence microscope comprising:
a microscope controller configured to control the fluorescence microscope with respect to an imaging process such that:
an illumination focus is generated by virtue of overlaying a focused depletion light distribution on a focused excitation light distribution for the stimulated emission depletion, as a result of which, during illumination with the illumination focus, the sample is excited to emit imaging fluorescence light only within an effective excitation focus, an extent of which is reduced in relation to an extent of the excitation light distribution, and
a plurality of sample segments are scanned successively within a target region of the sample by the illumination focus with a first spatial resolution that has been adapted to the reduced extent of the effective excitation focus, the sample segments being imaged into a corresponding plurality of image segments, from which a scanned image is generated,
an overview image of the target region is generated with a second spatial resolution prior to the imaging process, the second spatial resolution being lower than the first spatial resolution and higher than a third spatial resolution that has been adapted to the extent of the excitation light distribution, the overview image being analyzed such that image regions without relevant image information are identified; and at least the radiant flux of the depletion light distribution is reduced within a scope of the imaging process when scanning the sample segments which are assigned to the image regions without relevant image information that were identified in the overview image.

* * * * *